United States Patent [19]

Wada et al.

[11] Patent Number: 5,595,697
[45] Date of Patent: Jan. 21, 1997

[54] METHOD OF MANUFACTURING A SEALING DEVICE

[75] Inventors: Noriyuki Wada; Takayuki Nishigaki, both of Fukushima, Japan

[73] Assignee: NOK Corporation, Tokyo, Japan

[21] Appl. No.: 2,506

[22] Filed: Jan. 6, 1993

Related U.S. Application Data

[63] Continuation-in-part of Ser. No. 645,442, Jan. 24, 1991, Pat. No. 5,183,271.

[30] Foreign Application Priority Data

| Jan. 25, 1990 | [JP] | Japan | ......................... 15912 |
| Feb. 7, 1990 | [JP] | Japan | ......................... 27386 |

[51] Int. Cl.$^6$ .............................. D29C 43/18; F16J 15/32
[52] U.S. Cl. ..................... 264/735; 264/138; 264/159; 264/266; 264/268; 277/152; 425/DIG. 47
[58] Field of Search .................................. 264/135, 138, 264/159, 249, 263, 266, 268; 156/245; 29/527.1; 277/152, 153; 425/112, DIG. 47

[56] References Cited

U.S. PATENT DOCUMENTS

| Re. 33,192 | 4/1990 | Bainard et al. | 264/266 |
| 1,978,239 | 10/1934 | Wheeler | 277/134 |
| 2,208,482 | 7/1940 | Victor | 277/152 |
| 2,218,638 | 10/1940 | Christianson | 277/227 |
| 2,329,028 | 9/1943 | Austin | 277/152 |
| 2,370,913 | 3/1945 | Proctor | 277/227 |
| 2,574,062 | 11/1951 | Reynolds | 277/48 |
| 3,254,898 | 9/1966 | Herbenar et al. | 277/47 |
| 3,549,445 | 12/1970 | McMahon | 277/35 |
| 3,837,660 | 9/1974 | Poggio | 277/227 |
| 4,038,359 | 7/1977 | Pendleton | 264/268 |
| 4,042,248 | 8/1977 | Williamitis | 277/134 |
| 4,159,298 | 6/1979 | Bainard | 264/268 |
| 4,166,627 | 9/1979 | Bainard et al. | 277/227 |
| 4,406,847 | 9/1983 | O'Neal et al. | 264/266 |
| 4,501,431 | 2/1985 | Peisker et al. | 277/152 |
| 4,555,376 | 11/1985 | Butler | 264/268 |
| 4,613,143 | 9/1986 | Butler | 277/134 |

(List continued on next page.)

FOREIGN PATENT DOCUMENTS

| 867189 | 5/1951 | Germany | 277/47 |
| 3327229 | 2/1985 | Germany | 277/152 |
| 3506696 | 5/1986 | Germany | 277/152 |
| 3526731 | 2/1987 | Germany | 277/152 |
| 3608954 | 9/1987 | Germany | 277/152 |
| 0182674 | 7/1989 | Japan | 277/152 |
| 976170 | 11/1982 | U.S.S.R. | 277/227 |
| 687430 | 2/1953 | United Kingdom | 277/35 |
| 8001832 | 9/1980 | WIPO | 277/227 |

*Primary Examiner*—Robert B. Davis
*Attorney, Agent, or Firm*—Armstrong, Westerman, Hattori, McLeland & Naughton

[57] ABSTRACT

A sealing device to be mounted between a member and a rotation shaft which can be rotated relatively to the member, includes an annular flanged portion formed of a resin and disposed to surround the rotation shaft, and extends in a radial direction of the rotation shaft. A resin seal lip extends from an inner end of the flanged portion in an axial direction of the rotation shaft toward fluid to be sealed in such a manner that the resin seal lip surrounds the rotation shaft. The resin seal lip has a first seal ring having a sealing surface which hermetically and slidably contacts the rotation shaft, a second seal ring having an elastic flanged portion formed of a rubber material and disposed to surround the rotation shaft and extending in a radial direction of the rotation shaft, and an elastic seal lip extending, over the resin seal lip, from an inner end of the elastic flanged portion in the axial direction of the rotation shaft toward the fluid to be sealed to surround the resin seal lip. The elastic seal lip incorporates a lip leading portion having a sealing surface which slidably and hermetically contacts the rotation shaft. The flanged portion and the elastic flanged portion are bonded and secured to each other while interposing at least one continuous bonded portion to continuously surround at least the rotation shaft, and the continuous bonded portion seals the joining surface between the flanged portion and the elastic flanged portion.

2 Claims, 10 Drawing Sheets

U.S. PATENT DOCUMENTS

| | | | |
|---|---|---|---|
| 4,623,153 | 11/1986 | Nagasawa | 277/166 |
| 4,721,314 | 1/1988 | Kanayama et al. | 277/166 |
| 4,723,350 | 2/1988 | Kobayashi et al. | 264/159 |
| 4,755,115 | 7/1988 | Akaika | 277/152 |
| 4,867,926 | 9/1989 | Matsushima | 264/268 |
| 5,104,603 | 4/1992 | Saitoh | 264/266 |
| 5,106,565 | 4/1992 | Saitoh | 264/268 |
| 5,183,617 | 2/1993 | Saitoh | 264/266 |

FIG.6
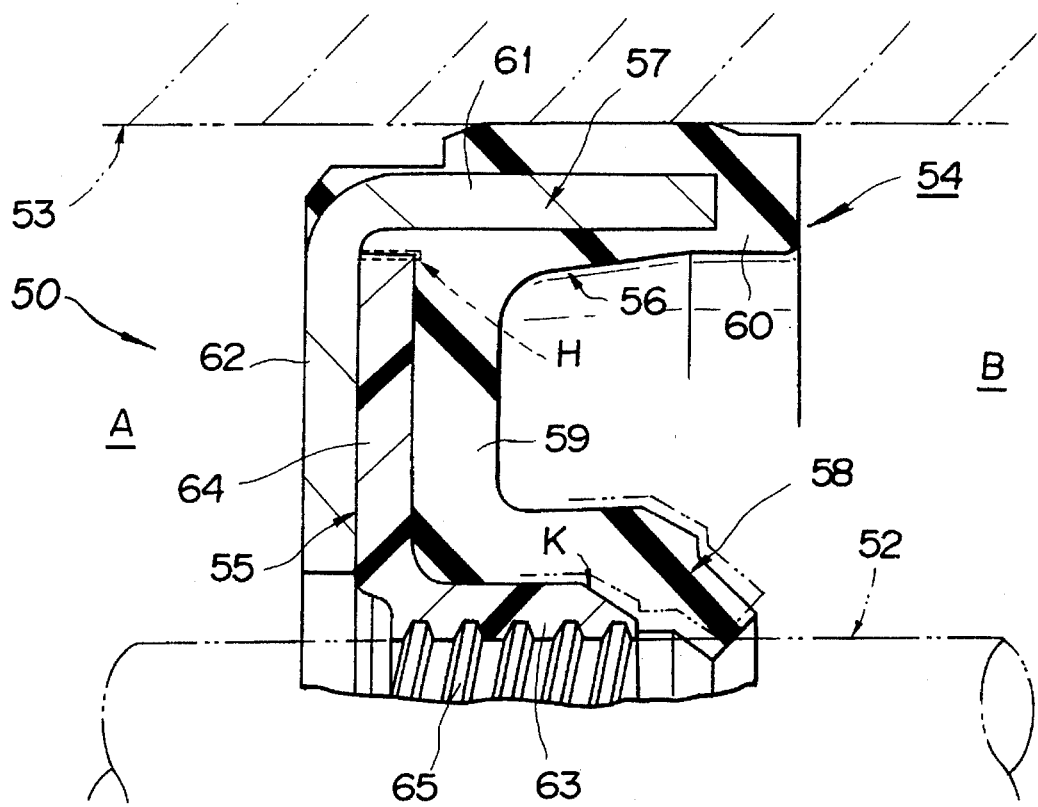
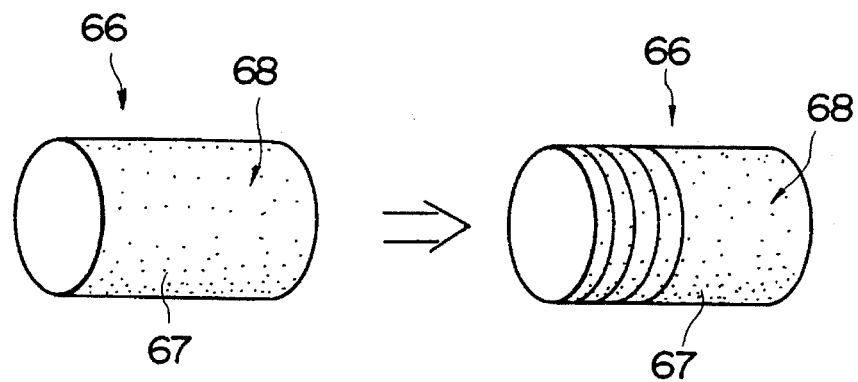
FIG. 7A    FIG. 7B

METHOD OF MANUFACTURING A SEALING DEVICE

REFERENCE TO RELATED APPLICATIONS

This application is a continuation-in-part of prior U.S. patent application Ser. No. 07/645,442 filed on Jan. 24, 1991, now U.S. Pat. No. 5,183,271 issued on Feb. 2, 1993.

BACKGROUND OF THE INVENTION

The present invention relates to the sealing device utilized for a construction machine, a vehicle for civil construction engineering or an engine of an automobile and, more particularly, to a sealing device provided with a seal lip made of resin material and a seal lip made of rubber-like elastic material, which are firmly sealingly engaged with each other, and also relates to a method of manufacturing the sealing device.

One example of conventional sealing devices will be described hereunder with reference to FIGS. 10 and 11.

Referring to FIG. 10, a sealing device is generally designated by reference numeral 100. The sealing device 100 comprises a first seal ring 103 provided with a seal lip 102 made of resin (hereinafter resin seal lip 102) hermetically contacting a rotating shaft 101 of a machinery such as a construction machine to which the sealing device is applied, and a second seal ring 105 provided with a seal lip 104 made of rubber-like elastic material (hereinafter rubber seal lip 104). These two seal rings 103 and 105 are in a tightly contacting relationship, but not bonded to each other. To the second seal ring is bonded a reinforcing ring 106 which are formed a plurality of holes 107 on the circumferential portion thereof. The first seal ring 103 is provided with a base portion 108 on which are formed a plurality of projections 108a, which are engaged with the holes 107 of the reinforcing ring 106, for preventing the first seal ring from being rotated. An annular seal member 109 made of a felt material is disposed on one side, i.e., atmosphere side A of the second seal ring 105.

Before the application of the sealing device 100 to a housing 110 to be sealed, the inner diameter of the rubber seal lip 104 is made smaller than the outer diameter of the rotation shaft 101 in a state shown by a dotted line in FIG. 10 for ensuring an interference fit, and the back surface opposite the sealing surface by, of the resin lip 102 is in close contact with the second seal ring 105. When the second seal ring 105 is mounted, the rubber lip 104 is deformed as shown by a white arrow to thereby form a gap d between the back surface of the resin lip 102 of the first seal ring 103 and the second seal ring 105. An annular groove 111 is formed in the sealing surface of the resin lip 102.

In the sealing device 100 of the structure described above, the atmosphere on the side A in FIG. 10 is sucked through the grooves 111 by pumping action during the rotation of the rotating shaft 101 and the sealing fluid B is thus sealed. When the shaft 101 is not rotated, the sealing fluid B is sealed by the rubber lip 104. During the described operation of the sealing device 100, once the first and second seal rings 103 and 105, as well as the first seal ring 103 and the reinforcing ring 106, are not connected, the resin lip 102 and the rubber lip 104 of the first and second seal rings 103 and 105 are not influenced by each other, thus performing the sealing function.

In general, the sealing device of the structure described above may be formed in a formation mold, not shown, by heat compressing the first seal ring 103 and rubber material and then carrying out the vulcanization treatment to thereby tightly secure the both materials with relatively low cost.

However, with the sealing device 100 shown in FIG. 10, in a case where the sealing fluid B leaks on the side of the resin lip 102 by the lowering of the sealing performance due to the wearing or degradation of the rubber lip 104, the leaking fluid leaks on the side of the atmosphere A through the gap b, as shown by black arrows, between the contacting surface of the second seal ring 105 and the base portion 108 of the first seal ring 103 and the contacting surface of the base portion 108 and the reinforcing ring 106.

In another example of a sealing device 200 shown in FIG. 11, the first seal ring 202 provided with a resin lip 201 and the second seal ring 204 provided with a rubber lip 203 are formed independently and, thereafter, the sealing device 200 is formed by caulking, as shown by a symbol R in FIG. 11, the outer periphery of a reinforcing ring 205 integrally formed with the second seal ring 204.

According to this example, the leakage of the sealing fluid caused in the aforementioned example is not caused because of the formation of the caulked portion. However, it is obliged to additionally dispose a reinforcing ring 206 for supporting the first ring 202 and, in addition, the caulking process is required for assembling the first seal ring 202 and the second seal ring 204, thus increasing the manufacturing process and cost.

In a further example of the sealing device shown in FIG. 12, the sealing device 300 comprises a second seal ring 301 and a first seal ring 302 closely contacting to the second ring 301 on the side of the atmosphere A. The second seal ring 301 includes a sealing body composed of an annular engaging portion 303, a flanged portion 304 and a rubber seal lip 305 axially extending towards the sealing fluid side B and a metal ring 306. The first seal ring 302 includes a flanged portion 307 extending in a direction of the diameter of the rotation shaft and a resin seal lip 309 provided with a thread groove 308.

In the sealing device 300 of the structure described above, the rubber seal lip 305 and the resin seal lip are in close contact before the mounting thereof as shown in solid outline in FIG. 12, but when both the seal lips are assembled in a portion between the housing 310 and the rotation shaft 311, the seal lips 305 and 309 are elastically deformed in the diameter direction by amounts different from each other as shown by the dot and dash line (in the illustration, only the deformation amount of the seal lip 305 is shown), thereby achieving the sealing performance therebetween. Accordingly, the first and second seal rings 302 and 301 are in the state merely in contact with each other and the projection 313 formed to a sealing body S is engaged with an engaging hole 312 formed to the flanged portion 307 of the first seal ring 302 to thereby attain the rotation prevention function between the respective seal rings 301 and 302.

FIG. 13 shows a still further example of the sealing device of the prior art and the sealing device 400 is of substantially the identical structure of the sealing device 300 shown in FIG. 12 except as described below.

In the sealing device 400, an engaging hole 414 is formed in a metal ring 406, and an engaging projection 415 formed to a second seal ring 402 is engaged with the hole 414 to thereby attain the rotation prevention function between the first and second seal rings.

The other structures and the description thereof are eliminated herein by increasing the reference numerals herein by 100 in FIG. 13 to that applied to portions or members corresponding to those shown in FIG. 12, for example, second seal ring 301 in FIG. 12 is increased in number to arrive at second seal ring 401 in FIG. 13.

In both the examples shown in FIGS. 12 and 13, the sealing device 300 or 400 attains the sealing function for the sealing fluid B by sucking the atmosphere on the side A of the atmosphere by pumping function through the thread groove 308 or 408 during the rotation of the rotation shaft 311 or 411. When the rotation of the rotation shaft stops, the sealing of the fluid B can be performed by the seal lip 305 or 405. The sealing devices 300 or 400 are usually formed by a vulcanization treatment in a closely contacting condition with a desired shape by heating and pressing the ring-shaped resin material, metal ring and rubber material in a cavity of a mold, not shown.

However, with the sealing device 300 or 400 shown in FIGS. 12 or 13, in a case where the sealing fluid B leaks on the side of the resin lip 309 or 409 by the lowering of the sealing performance due to the wearing or degradation of the rubber lip 305 or 405, the leaking fluid leaks on the side of the atmosphere A through the gap d and the engaging hold 312 and through the contacting surface of the first seal ring 302 and the metal ring 306 (FIG. 12), and through the outer peripheral side of the first seal ring 402 and the engaging hole 414 (FIG. 13).

In addition, according to these examples, it is necessary to form the first seal ring before the vulcanization treatment so as to have an L-shaped cross section at the manufacturing of the sealing device. Furthermore, the engaging hold 312 of the first seal ring 302 and the engaging hole 414 of the metal ring 406 are additionally required for the manufacture of the sealing devices 300 or 400, thus being troublesome and involving increased manufacturing cost.

SUMMARY OF THE INVENTION

An object of the present invention is to substantially eliminate defects or drawbacks encountered in the prior art and to provide a sealing device and a method of manufacturing of the same capable of achieving an improved sealing function effectively preventing a sealing fluid from leaking outward.

This and other objects can be achieved in one aspect by providing a sealing device disposed between two members which are relatively rotatable, comprising a first seal ring provided with a resin seal lip being disposed in an axial direction of one of the members to be sealed and having a first sealing surface, a second seal ring provided with an elastic rubber seal lip disposed in an axial direction of one of the members to be sealed, the rubber seal lip being provided with a sealing surface closely contacting to the sealing surface of the resin seal lip, and means for firmly securing the first and second seal rings.

In preferred embodiments, the means for securing the first and second seal rings is composed of an annular sealing recess formed on another surface of the resin seal lip opposed to the sealing surface thereof and a sealing projection formed on the sealing surface of the rubber seal lip of the second seal ring.

The first and second seal rings further include flanged portions respectively extending from base portions of the resin and rubber seal lips in a diameter direction of one of the members to be sealed, the flanged portion of the first seal ring having an end surface facing another one of members to be sealed and the means for securing the first and second seal rings is composed of a bonding agent disposed between the end face of the first seal ring and the flanged portion of the second seal ring.

In another aspect according to the present invention, there is provided a method of manufacturing a sealing device by utilizing a mold having an inner cavity, comprising the steps of preparing a ring member and an annular resin material having an L-shaped section including a cylindrical portion provided with an annular recess and a flanged portion, disposing the ring member and the annular resin material in the cavity of the mold in a laminated state, disposing a rubber material on the laminated ring member and the annular resin material, and heating and pressuring the ring member, the resin material and the rubber material disposed in the cavity to thereby carry out a vulcanization treatment so as to form a projection with a vulcanized rubber material, the projection having an outer shape corresponding to an inner shape of the annular recess.

In a further aspect of the present invention, there is provided a method of manufacturing a sealing device by utilizing a mold having an inner cavity, comprising the steps of preparing a ring member and an annular resin material having an L-shaped section including a cylindrical portion provided with an annular recess and a flanged portion, disposing the ring member and the annular resin material in the cavity of the mold in a laminated state, disposing a rubber material on the laminated ring member and the annular resin material, heating and pressurizing the ring member, the resin material and the rubber material disposed in the cavity to thereby carry out a vulcanization treatment, and applying a bonding agent to an end surface of the flanged portion.

According to the sealing devices and the manufacturing methods thereof of the character described above, in one aspect, the first seal ring provided with the resin seal lip and the second seal ring provided with the rubber seal lip are firmly sealingly engaged by engaging the sealing recess formed to the resin seal lip with the sealing projection formed to the rubber seal lip. The projection is formed at the same time of the vulcanization treatment of the second seal ring.

In another aspect, the resin seal lip and the rubber seal lip are closely seal contacted with a small gap between the sealing surfaces of both the seal lips. However, the end surface of the flanged portion of the first seal ring is bonded to the second seal ring, i.e. the metal ring or heated and fluidized rubber material, at the same time of the vulcanization treatment.

BRIEF DESCRIPTION OF THE DRAWINGS

In the accompanying drawings:

FIG. 6 is a sectional view similar to that of FIG. 1 showing a sealing device of a second embodiment according to the present invention;

FIGS. 7A and 7B respectively share steps in the pretreatment of a resin roll;

DETAILED DESCRIPTION OF THE PREFERRED EMBODIMENTS

Figure 1:
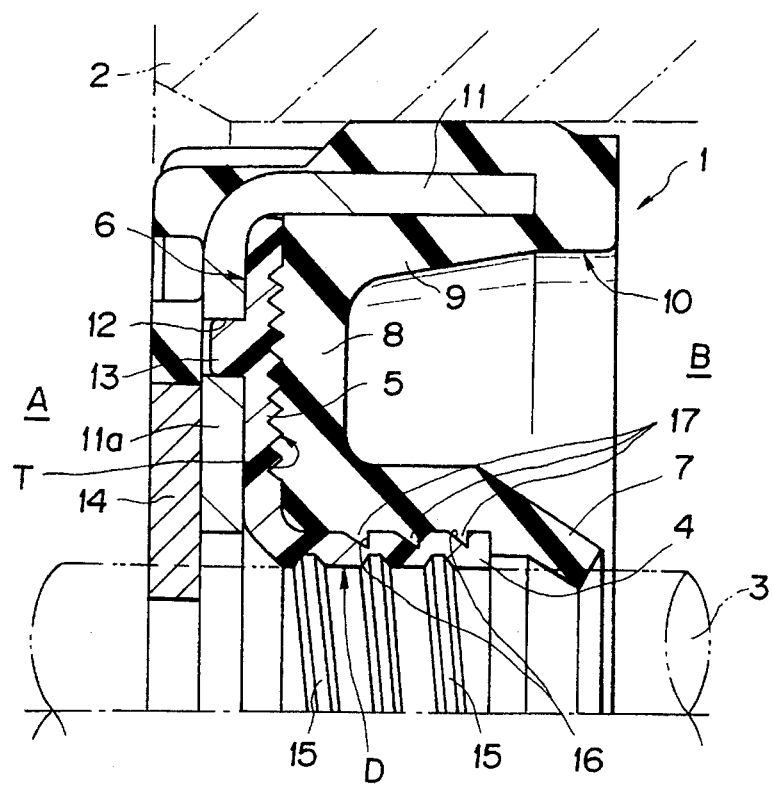
FIG. 1 is a sectional view of a half portion of a first embodiment of a sealing device, before the mounting to a machinery to be sealed, according to the present invention.

A first embodiment of a sealing device according to the present invention is first described with reference to FIGS. 1 to 5, in which FIG. 1 shows a sectional view of a half portion of a sealing device 1 before the mounting to machinery or mechanism to be sealed. The sealing device 1 is utilized by mounting the same between a housing 2 and a rotatable shaft 3 of the mechanism to be sealed. The sealing device 1 is composed of, by tightly securing, a first seal ring 6, totally made of a resin material such as ethylene tetrafluoride resin, comprising a resin seal lip 4 having substantially an L-shaped section and extending in an axial direction of the shaft 3 and a base portion 5 extending in a direction of a diameter of the shaft 3 and composed of a second seal ring 10, totally made of a rubber material, comprising a rubber elastic lip 7, a flanged portion extending in the direction of the diameter of the shaft 3 and a fitting portion 9. The first seal ring 6 is positioned on the side of the atmosphere A so as to support the atmospheric side surface of the second seal ring 10. A reinforcing ring 11 is formed integrally with the second seal ring 10. The first and second seal rings 6 and 10 are disposed in a contact state as well as the first seal ring 6 and the reinforcing ring 11. The reinforcing ring 11 is provided with an inward flanged portion 11a having a circumferential surface in which a plurality of engaging holes 12 are formed, only one hole being illustrated in FIG. 1 for the sake of convenience. Annularly spaced projections 13 are formed on the base portion 5 of the first seal ring 6 and the projections 13 are engaged with the holes 12 to thereby prevent the first seal ring 6 from being rotated. An annular sealing member 14 made of felt, for example, is disposed on the atmospheric side surface of the second seal ring 10.

Figure 2:
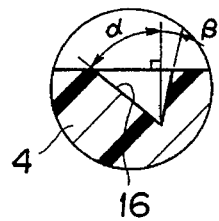
FIG. 2 is an enlarged view of a cutout groove of a resin seal lip of the sealing device shown in FIG. 1.
Figure 3:
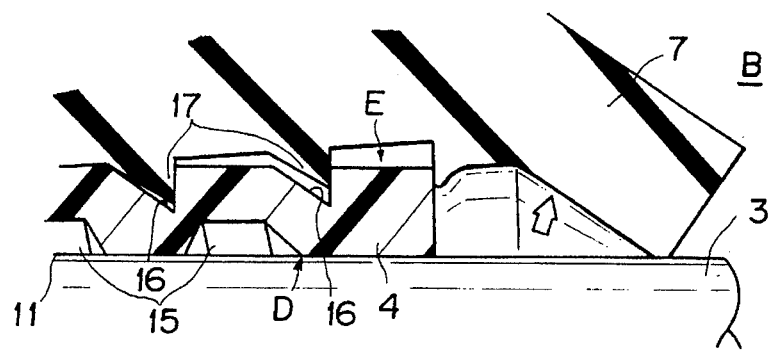
FIG. 3 is a portion of the sealing device shown in FIG. 1 after the mounting thereof.

The sealing device 1, before the mounting in the housing 2, since the inner diameter of the rubber lip 7 of the second ring 10 is made smaller than the outer diameter of the rotation shaft 10 so as to maintain an interference fit, the back surface (opposite to the sealing surface D, i.e. the sliding surface) of the resin lip 4 is in close contact with the second seal ring 10. After the mounting of the sealing device 1 in the housing 2, the rubber lip 7 is elastically deformed as shown by a white arrow to thereby form a gap E between the rubber lip 7 and the resin lip 4, as shown in FIG. 3. A thread groove 15 is formed in the sealing surface D of the resin lip 4. At least one sharp annular cutout groove 16 is formed on the back surface of the resin lip 4 as an annular sealing recess. The groove 16 may be formed in a spiral shape. As shown in FIG. 2, the cutout groove 16 is formed so as to have an angular relationship of $\alpha>\beta$, as shown in FIG. 2 in an enlarged scale, in which the symbol $\alpha$ designates an angle on the atmosphere side A and the symbol $\beta$ is an angle on the side of the sealing fluid B with a boundary of a line normal to the rotation shaft 3. At least one annular projection 17 in shape of a wedge in section is formed on the surface in close contact with the rear surface of the resin lip 4 as a sealing protrusion.

The sealing device 1 of the structure described above is operated as follows.

The atmosphere A is sucked along the thread groove 15 by the pumping function during the rotation of the rotation shaft 3 to thereby seal the sealing fluid B. On the other hand, when the rotation shaft 3 stops, the sealing fluid B is sealed by the rubber lip 7. In this state, the first and second seal rings 6 and 10 are not in close contact with each other, as well as the first seal ring 6 and the reinforcing ring 11, so that the resin lip 4 and the rubber lip 7 are not in interfering relationship with each other, thus attaining the sealing performance respectively.

During the sealing operation described above, as shown in FIG. 3, the annular projection 17 is in close contact with the inclining surface on the side of the sealing fluid B of the annular cutout groove 16 to thereby seal the gap E, so that there is no leak on the atmosphere side A through the gap E and the contacting surface between the reinforcing ring 11 and the first seal ring 6 even if the sealing fluid leaks through the sealing surface due to the wearing or degradation of the rubber lip 7.

The sealing device 1 of the first embodiment of the described character can be manufactured in the following manner.

Figure 4:
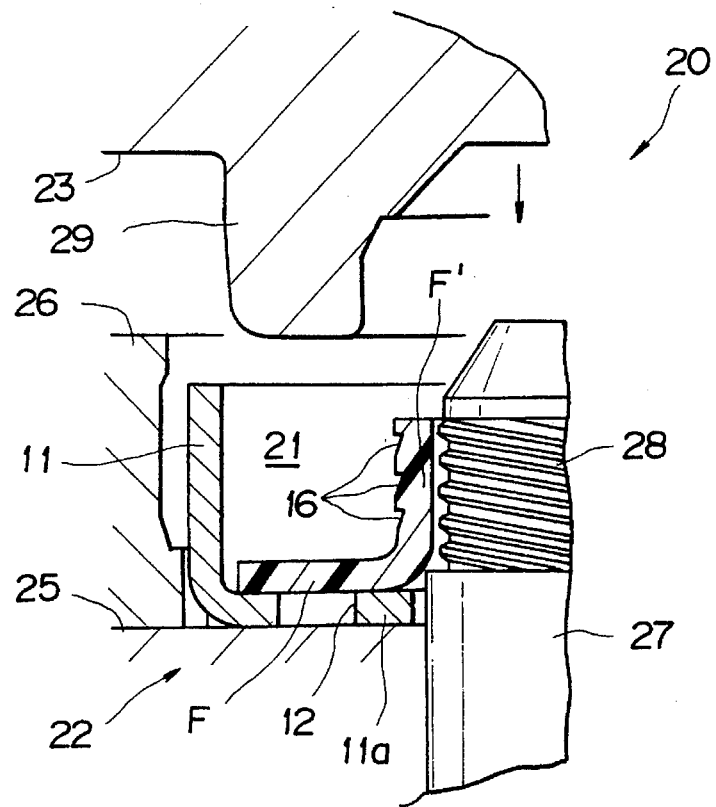
FIG. 4 represents an embodiment for manufacturing the sealing device of FIG. 1 in which the device is in the state before the vulcanization treatment with a mold being opened.
Figure 5:
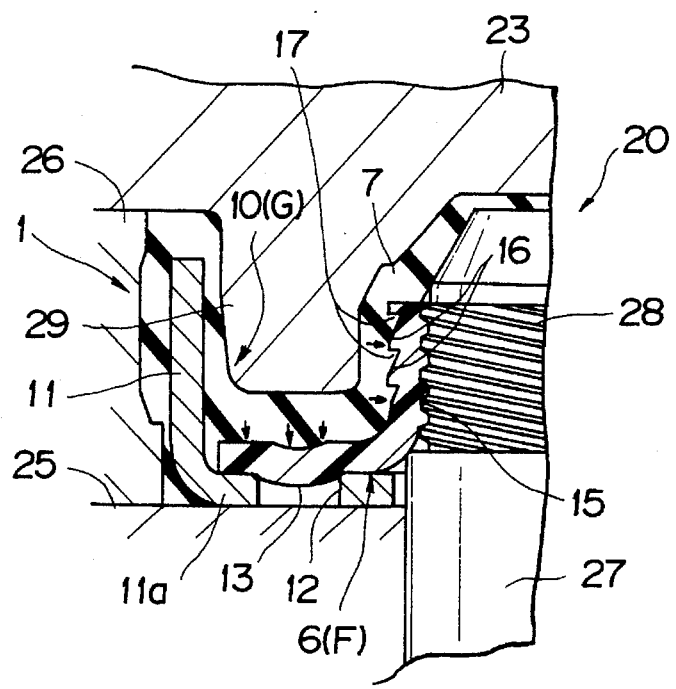
FIG. 5 shows a mold closing state at the vulcanization treatment.
Figure 8:
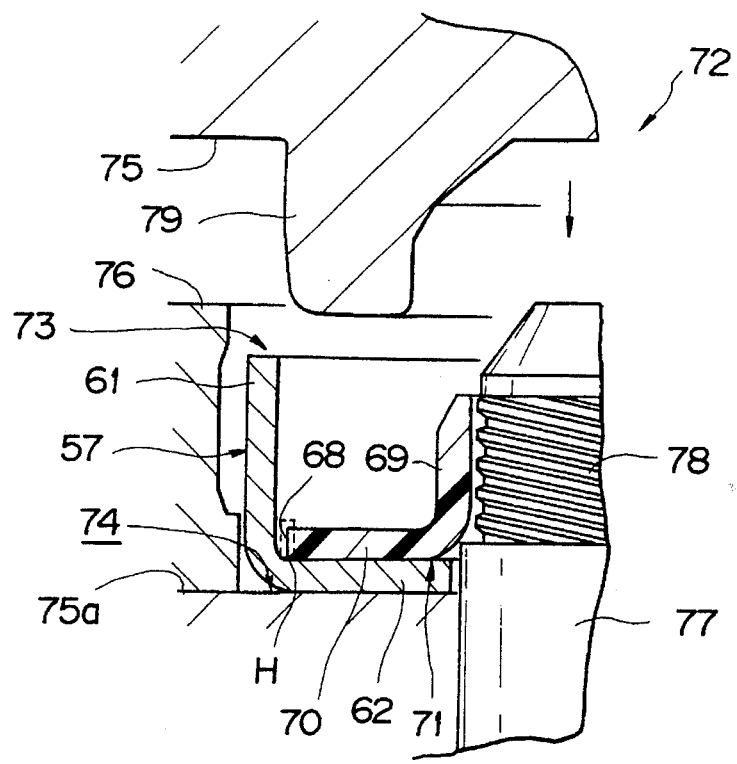
FIGS. 8 and 9 are views similar to those of FIGS. 4 and 5 with reference to the second embodiment.

The sealing device 1 is manufactured by using a mold assembly 20 of the type shown in FIG. 4. The mold 20 comprises upper and lower mold halves 23 and 22, and the lower mold half 22 includes a first molding member 25 for forming a bottom portion, a second molding member 26 for forming a wall portion of the inner diameter side and a core molding member 27. A male thread 28 is formed on the outer periphery of the core molding member 27.

The upper mold half 23 is provided with a lower surface on which is formed an annular projection 29 to be inserted into the lower mold half 22. When both the mold halves 22 and 23 are closed, an annular cavity 21 having a shape corresponding to the second seal ring 10 is defined between the projection 29 and the lower mold half 22.

In the next step, the reinforcing ring 11 and a ring-shaped resin material F for forming the first seal ring 6 are preliminarily molded before the vulcanization of the second seal ring 10. The resin material F has an L-shaped section and is provided with a cylindrical portion F' having an outer periphery in which the cutout groove 16 is preliminarily formed. The engaging holes 12 are formed to the inward flanged portion 11a of the reinforcing ring 11 along the circumferential direction thereof. The reinforcing ring 11 and the resin material F of the character described above are disposed in the laminated state in the opened mold cavity 21.

A rubber material, not shown, is further disposed in the mold 20, which is then closed. Under this condition, the heating and pressing processes are carried out. According to these processes, the cylindrical portion F' of the resin material F softened by the heat is forced against the surface of the core molding member 27 as shown by small arrows shown in FIG. 5, whereby the thread groove 15 having a shape corresponding to that of the male thread 28 formed on the surface of the core molding member 27 is formed on the inner peripheral surface of the cylindrical portion F'. At the same time, the projections 17 having a shape corresponding to that of the annular cutout groove 16 is vulcanized on the rubber material G closely contacting to the outer periphery of the cylindrical portion F'. Furthermore, the resin material is caused to intrude into the engaging hole 12 to thereby form the projection 13, thus realizing the firm and close sealing condition between the rubber material G and the resin material F.

After the vulcanization process, a mold product is taken out by opening the mold assembly and any excessive portion extending from the rubber lip 7 of the mold product is properly cut away, thus completing the manufacturing of the sealing device 1.

According to the first embodiment of the present invention, the annular cutout groove 16 corresponding to the annular projection 17 can be formed easily with reduced processing effort on the surface of the second seal ring 10 contacting the first seal ring 6.

In a preferred modification, as shown in FIG. 1, annular grooves T may be formed on the surface of the resin seal ring contacting to the surface of the rubber seal ring for effectively preventing the fluid from leaking inside the sealing device.

A second embodiment of the sealing device according to the present invention will be described hereunder with reference to FIGS. 6 to 9.

Referring to FIG. 6, a sealing device is designated by reference numeral 50 which is in a state before the mounting between a rotation shaft 52 and a housing 53 to be sealed. The sealing device 50 comprises a second deal ring 54 disposed on the sealing fluid side B and a first sealing ring 55 tightly contacting the atmospheric side surface A of the second seal ring 54.

The second seal ring 54 is composed of a sealing body 56 made of a rubber material and a metal ring 57 sintered to the sealing body 56, and the sealing body 56 comprises a seal lip 58 extending axially of the rotation shaft 52 to be sealed, an outward flanged portion 59 extending from a base portion of the seal lip 58 towards the housing 53 and an engaging portion 60 to be tightly contacted to the housing 53. The inner diameter of the seal lip 58 is made smaller than the outer diameter of the rotation shaft 52 to be sealed. The metal ring 57 is molded to be in an L-shape in section so as to have a cylindrical base portion 61 and an inward flanged portion 62 and the base portion 61 has a diameter larger than that of the first seal ring 55.

The first seal ring 55 is made of a resin material such as ethylene tetrafluoride resin so as to have an L-shaped section and is composed of a seal lip 63 extending axially of the rotation shaft 52 to be sealed and an outward flanged portion 54 extending from the base portion of the seal lip 63 towards the housing 53. A thread groove 65 is formed on the inner peripheral surface of the seal lip 63, and the inner diameter of the seal lip 63 is made smaller than the outer diameter of the rotation shaft 52 to be sealed. The seal lip 63 and the flanged portion 64 of the second seal ring 55 thus formed are closely contacted to the seal lip 58 and the flanged portion 59 of the second seal ring 54, respectively. The outer peripheral side end surface H on the housing side of the flanged portion 64 of the first seal ring 55 is fixedly bonded to the engaging portion 60 of the second seal ring 54 by bonding means such as a bonding agent.

When the sealing device 50 of the structure described above is mounted between the rotation shaft 52 and the housing 53 of machinery or the like to be sealed, the seal lips 58 and 63 are deformed in the radial direction of the rotation shaft 52 by the amounts different from each other and seal the rotation shaft 52 due to a predetermined interference. In the illustration of FIG. 6, only the deformation of the seal lip 58 is shown by dot and dash line because the seal lip 58 is deformed by the amount larger than that of the seal lip 63. Therefore, a gap K is caused between the seal lips 58 and 63.

The operation of the sealing device 50 of the character described above is as follows.

The atmosphere A is sucked along the threaded groove 65 by the pumping function during the rotation of the rotation shaft 52 to thereby seal the sealing fluid B. On the other hand, when the rotation shaft 52 stops, the sealing fluid B is sealed by the rubber seal lip 58. In this state, since the end surface H of the flanged portion 64 of the first seal ring 54 is bonded to the engaging portion 60 of the second seal ring 54, the sealing effect can be performed even if the sealing fluid B intrudes into the gap K through the sealing surface of the rotation shaft 52 due to the degradation, for example, of the seal lip 58, thus preventing the sealing fluid B from leaking in the atmospheric side A and hence attaining the sealing performance effectively.

In addition, the bonding performed between the end surface H of the flanged portion 64 extending in the diameter direction and the engaging portion 60 does not adversely affect on the elastic deformation of the seal lips 58 and 63 which is carried out for the ensurance of the interference. In a modification, the flanged portion 64 may be further extended towards the housing 53 and may be bonded to the base portion 61 of the metal ring 57.

The sealing device 50 of this embodiment will be manufactured in the following manner.

Referring first to FIG. 7, a resin roll 66 is first prepared and a metal natrium (sodium), for example, is applied on the outer peripheral surface 67 of the resin roll 66 to make coarse the surface 67 to increase the surface area. A bonding agent 68 is thereafter coated on the metal natrium surface with a predetermined thickness. The resin roll 66 is cut with a predetermined thickness as shown in FIG. 7B. As show in FIG. 8, the cut resin roll is thereafter worked to form a resin material 71 provided with a cylindrical portion 69 and an outward flanged portion 70 extending in a diameter direction thereof from one end of the cylindrical portion 69. The end surface H of the flanged portion 70 is coated with the bonding agent 68. There is also prepared a metal ring 57 having a diameter larger than that of the resin material 71. The metal ring 57 and the resin material 71 are disposed in a cavity 73 of a mold 72, which is composed of lower and upper, as viewed, mold halves 74 and 75. The lower mold half 74 is composed of a first molding member 75a forming the bottom surface of the sealing device, a second molding member 76 for forming an outer diameter side wall surface and a core molding member 77. On the outer peripheral surface of the core molding member 77 is formed a male thread 78.

On the lower surface of the upper mold half 75 is formed an annular projection 79 to be inserted into the lower mold half 74 so that the annular cavity 73 is defined between the projection 79 and the lower mold half 74 when the mold 72 is closed.

The vulcanization treatment of the sealing device 50 is carried out in accordance with the following manner.

Figure 9:
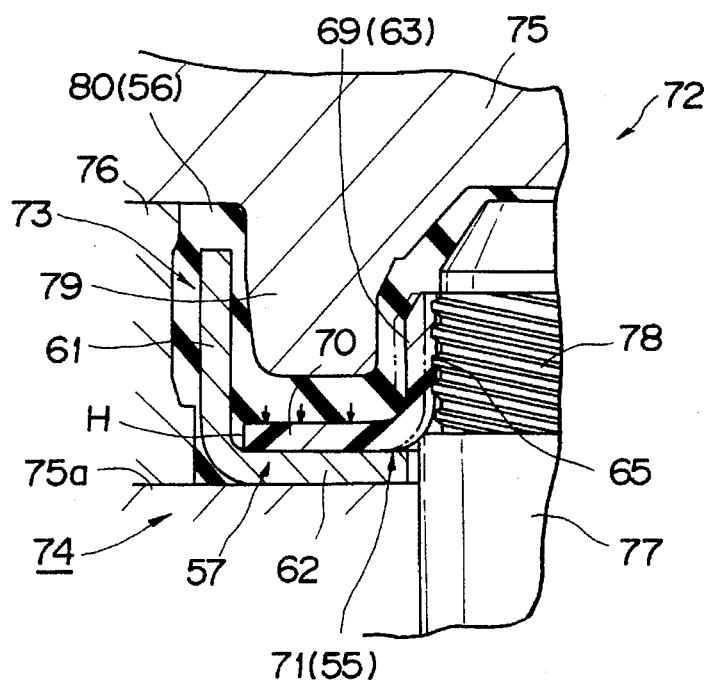
Figure 10:
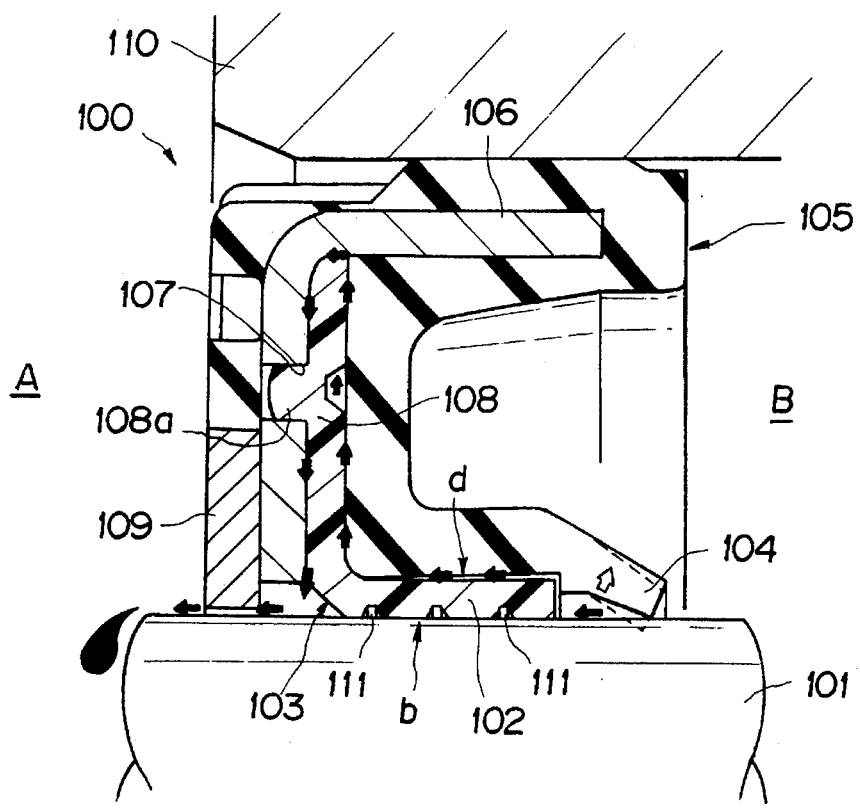
FIGS. 10 to 13 are views similar to those of FIGS. 1 and 6 of sealing devices according to the prior art.
Figure 11:
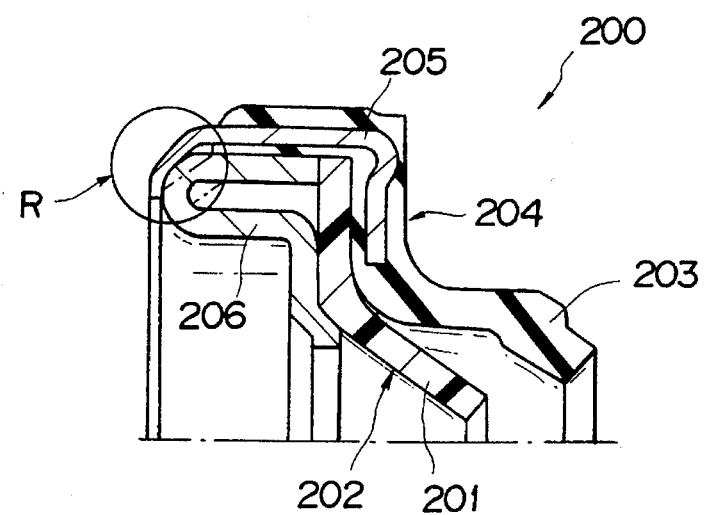
Figure 12:
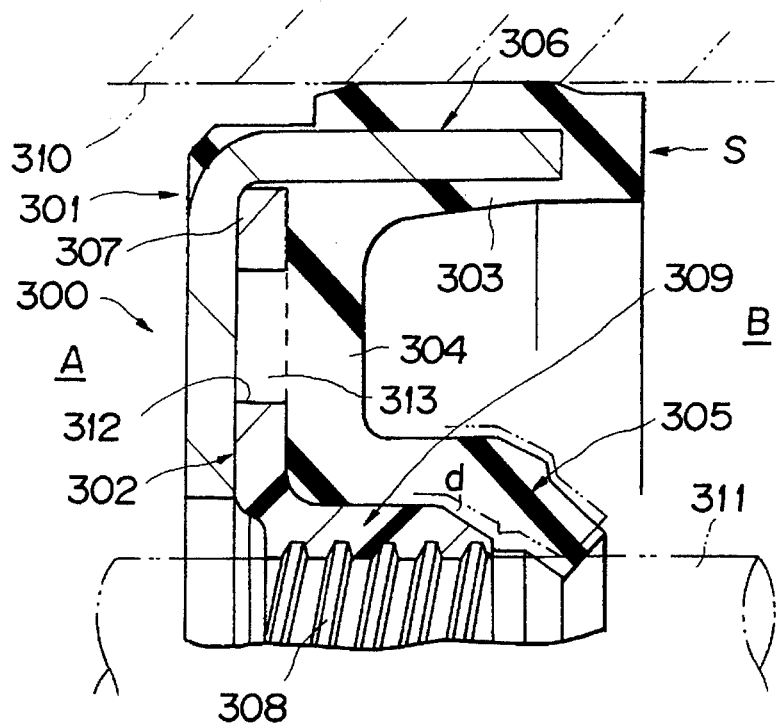
Figure 13:
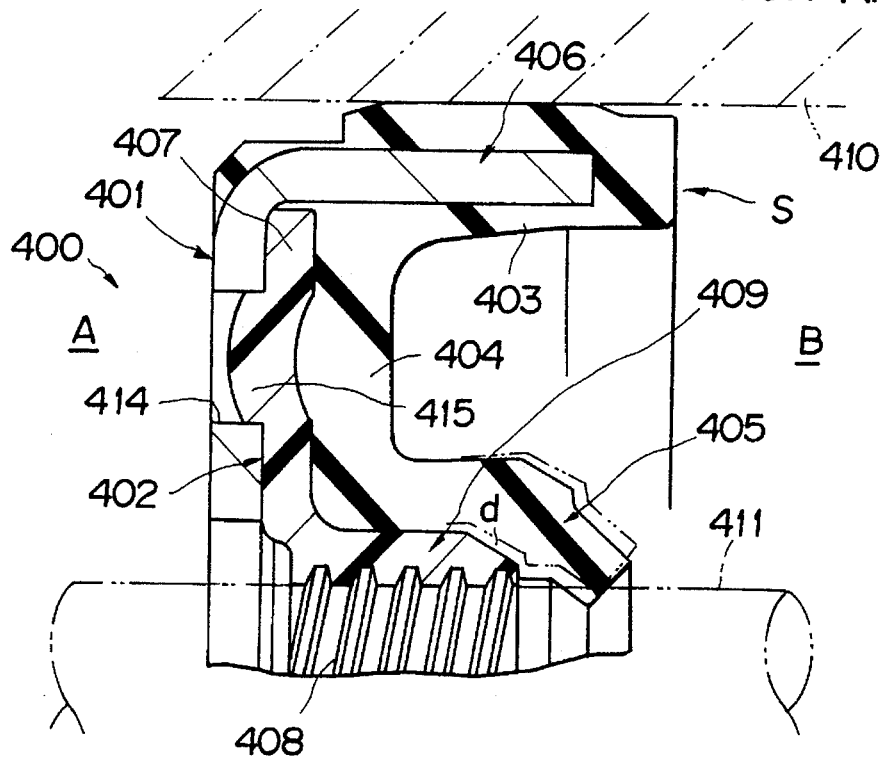

First, a rubber material, not shown, is positioned in the cavity 73 and the mold 72 is then closed. Heating and press-rising treatments are thereafter performed. A rubber 80 fluidized as shown in FIG. 9 flows in the cavity 73 along the surfaces of the cylindrical portion 69 and the flanged portion of the resin material 71. The cylindrical portion 69 softened by the heat treatment is forced against, as shown by arrows, the surface of the core molding member 77 by the pressure of the fluidized rubber 80, whereby a thread groove 65 having a shape corresponding to the male thread 78 formed on the surface of the core molding member 78 is formed on the inner peripheral surface of the cylindrical portion 69 of the resin material 71.

Substantially at the same time, the rubber 80 is bonded to the end surface H of the flanged portion 70 of the resin material 71.

After the vulcanization process, a mold product is taken out from the mold 72 and the excess portion of the rubber 80 is cut away, thus forming the sealing device 50. When the mold product is taken out from the mold 72, the resin material 71, i.e. the seal lip 63 of the first seal ring 55, is deformed in a direction of the inner diameter thereof by the replacing force thereof, thus ensuring the interference at the mounting time of the sealing device into the housing 53.

According to this embodiment, since the bonding between the rubber 80 and the end surface H of the resin material 71 is performed at the same time as the vulcanization treatment, thus removing a process for forming the engaging hole.

The resin material 71 may be bonded to the metal ring 57 by enlarging the diameter of the flanged portion 70 thereof.

Furthermore, in the illustrated embodiment, the sealing device 50 is secured to the housing side 53 and the seal lips 58 and 63 are closely contacted to the rotation shaft 52, but in an alternation, the sealing device 50 may be secured to the rotation shaft side 52 and the seal lips 58 and 63 may be closely contacted to the housing 53.

Figure 14:
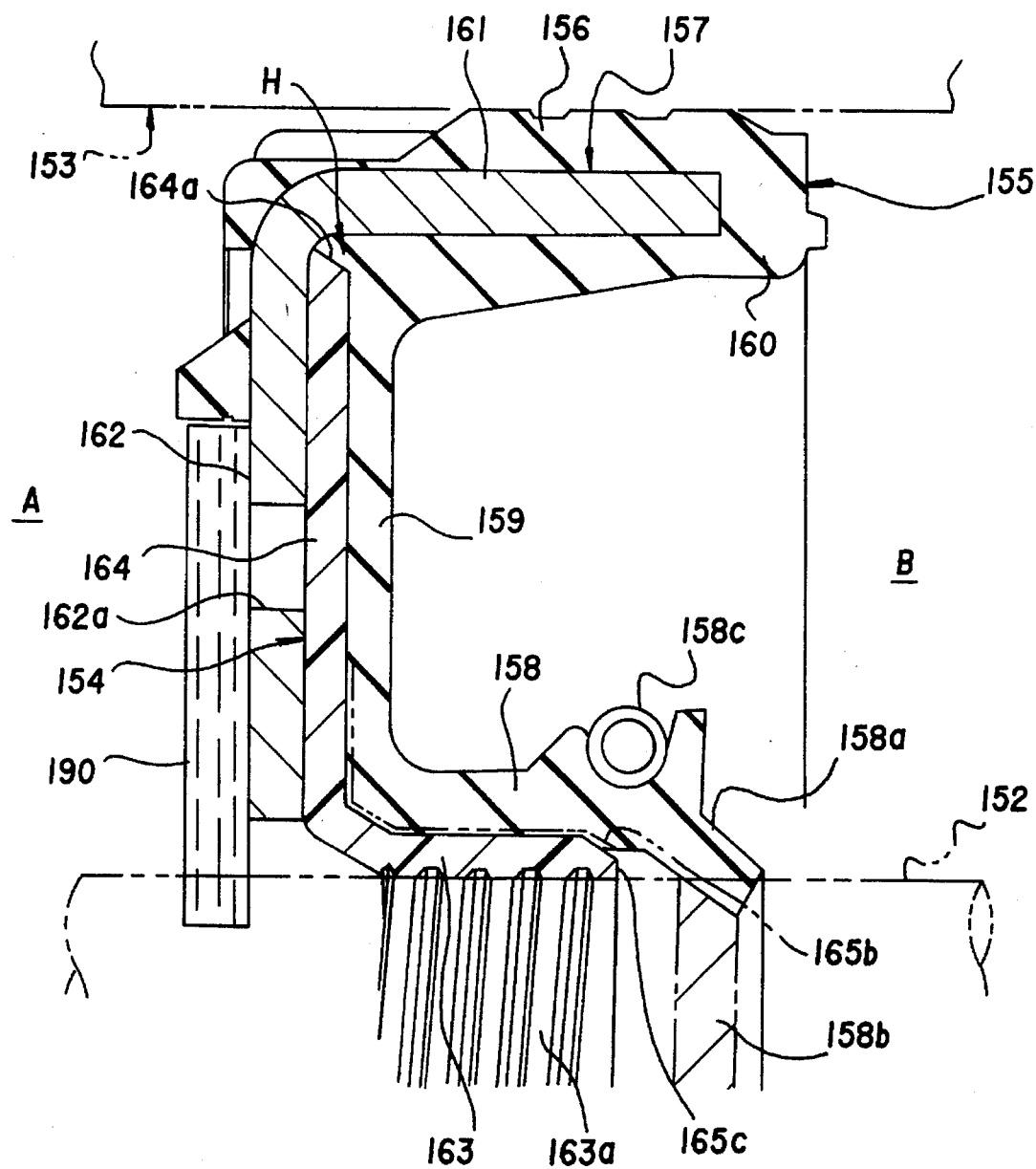
FIG. 14 is a sealing device according to another embodiment of the present invention, similar to FIG. 1.

FIG. 14 is a sealing device according to another embodiment of the present invention.

The sealing device according to this embodiment comprises a first seal ring 154 made of resin and a second seal ring 155 made of rubber-like elastic material, the first seal ring 154 and the second seal ring 155 being annular members disposed in a gap present between the inner surface of a housing 153 and the outer surface of a rotation shaft 152 which is coaxially and relatively rotatively fastened with respect to the housing 153.

The first seal ring 154 comprises a resin flanged portion 164 formed into a washer-like shape to surround the rotation shaft 152 and extending in a direction of the radius of the rotation shaft 152, the first seal ring 154 further comprising a resin seal lip 163 formed into a cylinder-like shape extending from the inner extremity of the resin flanged portion 164 in an axial direction of the rotation shaft 152. The inner surface of the resin seal lip 163 is slidably disposed in hermetically contact with the outer surface of the rotation shaft 152. A thread groove 163a is formed in the surface of the resin seal lip 163 which slides on the rotation shaft 152, the thread groove 163a having a pumping function, so that a sealing effect is improved.

On the other hand, the second seal ring 155 comprises a rubber-like elastic flanged portion 159 formed into a washer-like shape, made of a rubber-like elastic material reinforced by a reinforcing ring 157 and extending in a direction of the radius of the rotation shaft 152, the second seal ring 155 further comprising a rubber-like elastic seal lip 158 extending from the inner extremity of the rubber-like elastic flanged portion 159.

The reinforcing ring 157 is a metal annular member having an L-shaped cross sectional shape and comprising an outer cylindrical portion 161 integrally embedded with the outer fitting portion 156, the reinforcing ring 157 further comprising a metal flanged portion 162 extending from the extremity of the atmospheric side of the outer cylindrical portion 161 in a direction of the radius of the rotation shaft 152. The metal flanged portion 162 supports the surface of the resin flanged portion 164 of the first seal ring 154 adjacent to the atmosphere. The metal flanged portion 162 and the resin flanged portion 164 are laminated. Therefore, the rubber-like elastic flanged portion 159, the resin flanged portion 164 and the metal flanged portion 162 are stacked sequentially in a direction from fluid B to be sealed toward atmosphere A.

The rubber-like elastic seal lip 158 is disposed to surround the resin seal lip 163 while being positioned in contact in the direction of with the outer surface of the resin seal lip 163. A lip extremity 158a of the rubber-like elastic seal lip 158 extends t the fluid B to be sealed after it has exceeded the leading portion of the resin seal lip 163. Also a thread groove 158b having the pumping function is formed in the sliding surface of the lip extremity 158a. Furthermore, a spring 158c for causing the rubber-like elastic seal lip 158 to attain clamping force is fastened to the lip extremity 158a.

The fluid B is sealed doubly by the rubber-like elastic seal lip 158 and the resin seal lip 163.

The pressure of the seal fluid acting on the rubber-like elastic seal lip 158 is maintained by the resin seal lip 163, so that an excessive increase in the sliding resistance of the lip extremity 158a of the rubber-like elastic seal lip 158 and proceeding of abrasion under high pressure are prevented.

Although the rubber-like elastic seal lip 158 extends along the back surface of the resin seal lip 163, they are separated from each other so as to be capable of individually moving, so that the rubber-like elastic seal lip 163 is able to follow small projections and pits of the surface of the rotation shaft 152 and the small irregular movement of the same.

On the other hand, the resin flanged portion 164 and the rubber-like elastic flanged portion 159 are secured to each other by bonding. The bonded region has a continuous bonded portion H which continuously surrounds at least the rotation shaft 152. By virtue of the continuous bonded portion H, leakage of the sealed fluid passing through a portion between the joined surfaces of the resin seal lip 163 and the rubber-like elastic seal lip 158 is prevented.

In the illustrated embodiment, the continuous bonded portion H is formed on the outer extremity surface 164a is tapered in a direction along which its diameter is reduced toward the fluid B to be sealed, so that a contact area with a rubber-like elastic member 160 is enlarged and therefore bonding can be performed assuredly.

Figure 15:
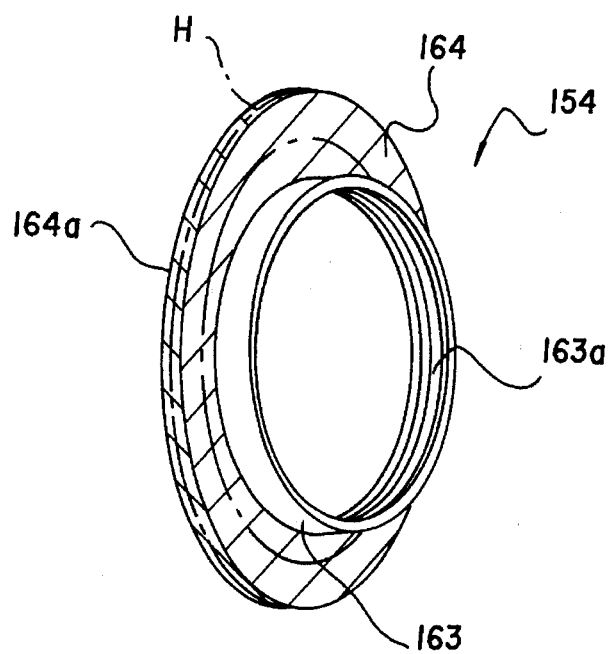
FIG. 15 is a perspective view of a first seal ring of the sealing device shown in FIG. 14.

The position, to which the continuous bonded portion H is formed, is not limited to the outer extremity surface 164a of the resin flanged portion 164. The continuous bonded portion H may, as shown in FIG. 15, be enlarged to a region in the vicinity of the outer extremity surface 164a, or the same is formed in a portion except for the outer extremity surface 164a. In short, it may be disposed at an arbitrary position in a range (hatched portion on FIG. 15) in which the resin flanged portion 164 comes in contact with the rubber-like elastic flanged portion 159. However, it is preferable that the continuous bonded portion H be not formed adjacent to the inner extremity of the resin flanged portion 164 but be formed adjacent to the outer extremity of the same in order to realize excellent following characteristics of the rubber-like elastic seal lip 158. An area shown by two dots and chain line is an area not bonded.

As an alternative to forming one continuous bonded portion H, a plurality of continuous bonded portions H may be formed from the inner extremity adjacent to the resin seal lip 163 to the outer extremity to surround it several times. As a result, reliability can be improved because a leakage from sealing taken place in a portion of the continuous bonded portion H can be sealed by another portion of the continuous bonded portion H.

As an alternative to partially forming the continuous bonded portion H, the overall contact surface may be bonded.

The contact surfaces of the resin flanged portion 164 and the metal flanged portion 162 may be bonded to each other, or may be freed from bonding. In the case where a continuous bonded portion similarly to the resin flanged portion 164 and the rubber-like elastic flanged portion 159 is formed between the resin flanged portion 164 and the metal flanged portion 162, the sealing performance can further be improved.

On the other hand, a dust seal member 190 is, by bonding secured to the surface of the metal flanged portion 162 adjacent to the atmosphere in order to prevent undesirable introduction of dust. The dust seal member 190 is manufactured by forming a cloth such as non-woven fabric or the like into a washer-like shape, the dust seal member 190 having an inner extremity which slidably comes in contact with the rotation shaft 152. Though not shown, the resin flanged portion 164 bites a hole 162a of the metal flanged portion 162 to be surely secured.

Figure 18:
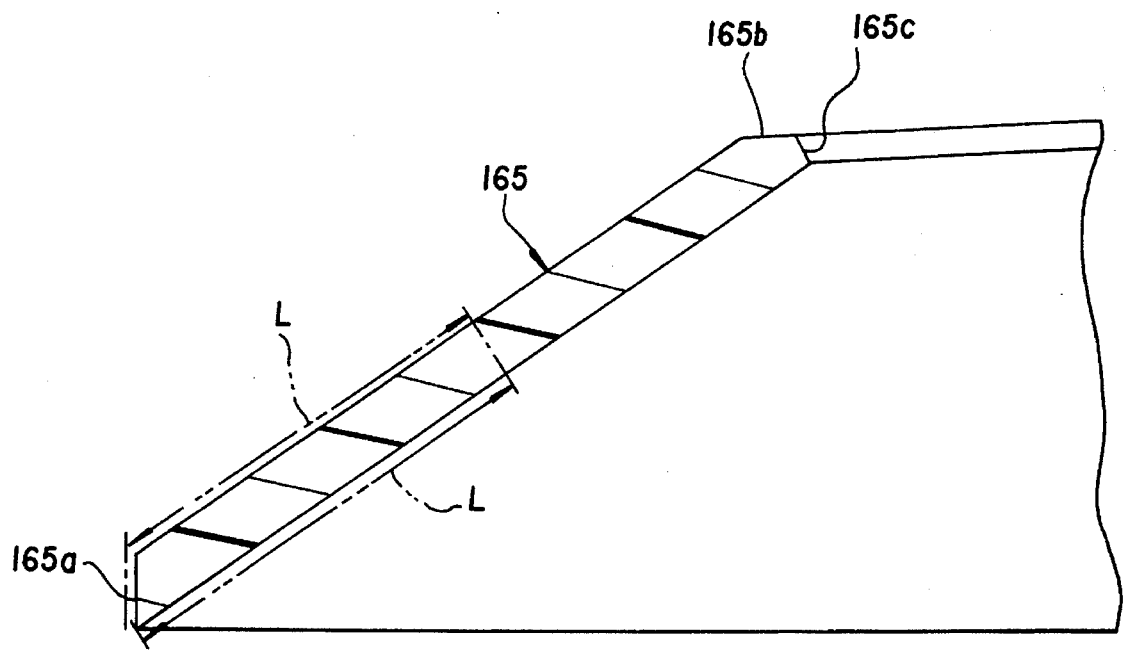
FIG. 18 illustrates application of adhesive to an outer extremity surface of the intermediately-molded resin member formed by the steps in FIGS. 17A–17D.

FIGS. 16 to 18 illustrate a method of manufacturing the sealing device thus structured.

The sealing device according to this embodiment is basically manufactured by integrally molding the resin first seal ring 154 made of the resin and the second seal ring 155 made of the rubber-like elastic material by using a mold.

Prior to performing the molding process, an intermediately-molded resin member 165 having an intermediate shape, which will be formed into the first seal ring 154, is formed. The intermediately-molded resin member 165 is formed into a bevel washer shape having the inner extremity which will be formed into the resin seal lip 163 and the outer extremity which will be formed into the resin flanged portion. The aforesaid inner extremity has two chamfers 155a and 155b.

Figure 17A:
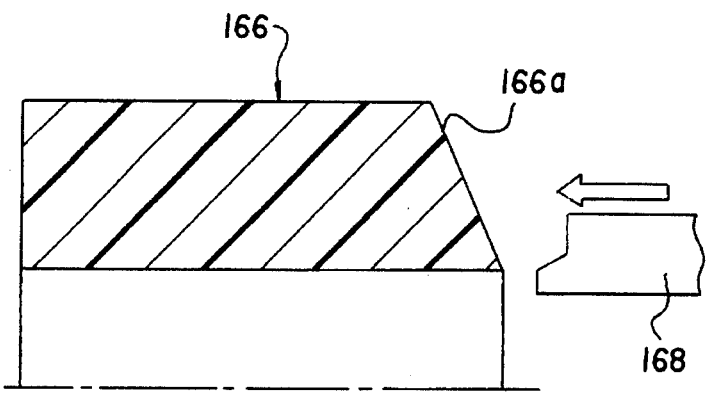
FIGS. 17A, 17B, 17C, and 17D illustrate four steps in forming an intermediately molded resin member according to the present invention.
Figure 17B:
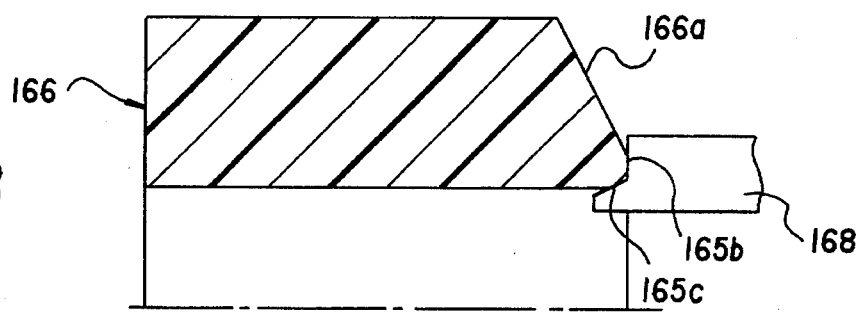
Figure 17C:
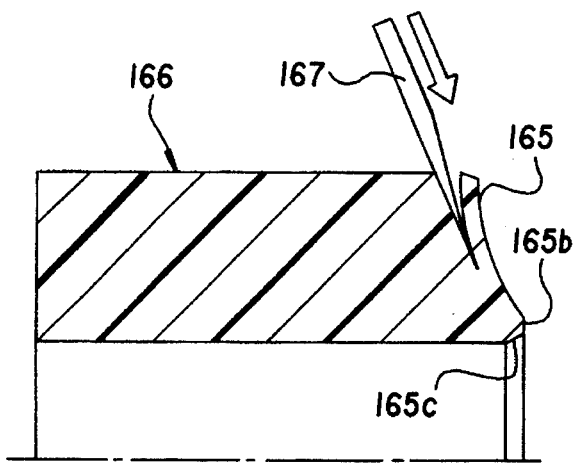
Figure 17D:
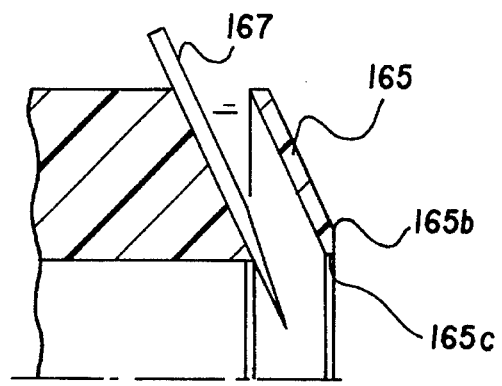

The aforesaid intermediately molded resin member 165 as shown in FIGS. 17C and 17D is formed, while having a predetermined thickness, by cutting an end surface 166a of a raw resin material 166 formed into a cylinder having a thick wall. For example, it can easily be formed by cutting the raw resin material 166, which is being rotated around its central axis, by using a knife 167.

Chamfered portions 165b and 165c formed at the inner extremities of the intermediately-molded resin member 165 may be formed after the intermediately-molded resin member 165 has been obtained by cutting. As an alternative to this, it may be obtained by cutting as described above after the inner extremities of conical end surface 166a of the raw resin material 166 have been chambered by means of a knife or bite 168 as shown in FIGS. 17A and 17B.

Then, an adhesive is applied to an outer extremity surface 165a of the intermediately-molded resin member 165 thus molded as shown in FIG. 18, the adhesive being applied continuously along the circumference. The applied adhesive is able to overflow into the two side surface of the intermediately-molded resin member 165 over the outer extremity surface 165a as well as the outer extremity surface 165a of the same. Since the adhesion of the adhesive to the inner surface of the intermediately-molded resin member 165 causes the resin seal lip 163 and the rubber-like elastic seal lip 158 to be undesirably bonded to each other at the time of the molding process, an allowable range L, which is not affected by the adhesive, is determined. The allowable range L corresponds to a portion of the outer surface of the intermediately-molded resin member 165 which will be formed into the resin flanged portion 164 after the molding process is completed.

Since the continuous bonded portion H is not limited to the outer extremity surface 164a of the resin flanged portion 164 but the same may be formed at an arbitrary position of the contact surface between the resin flanged portion 164 and the rubber-like elastic flanged portion 159 as described above, the position of the application is determined to correspond to the position of the continuous bonded portion.

As for the adhesive, an optimum adhesive is selected to be adaptable to the employed resin material which constitutes the first seal ring 154 and the employed rubber-like elastic material which constitutes the second seal ring 155. If necessary, surface treatment is applied prior to applying the adhesive. In the case where PTFE (polytetrafluoroethylene) is employed as the resin material, the surface is applied with a metal sodium treatment to be activated because the PTFE has unsatisfactory adhesivity. However, bonding can be performed while eliminating the necessity of using the adhesive depending upon the material, because the adhesive is selected depending upon the material relationship between the resin material and the rubber-like elastic material. In the case of a certain type of rubber material, a bonded state can be realized only by subjecting the surface of the intermediately-molded resin member 165 to the metal sodium treatment.

The intermediately-molded resin member 165 is, together with the reinforcing ring 157 and a rubber material 180 to be molded, inserted into an opened mold 172, and it is, together with the rubber-like elastic seal ring 154, molded.

Figure 16A:
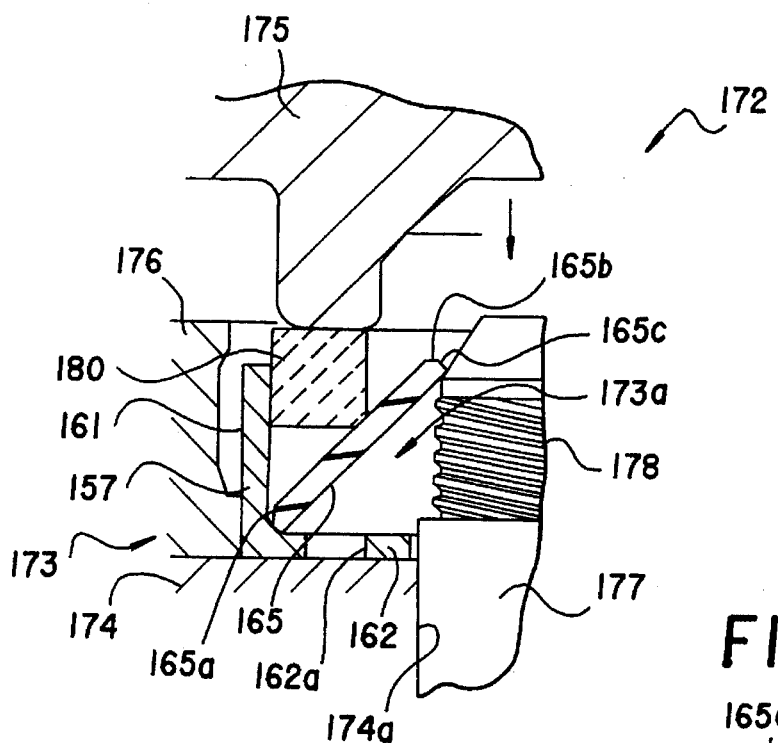
FIGS. 16A, 16B, and 16C illustrate three steps in producing a second seal ring for an embodiment of the sealing device according to the present invention.
Figure 16C:
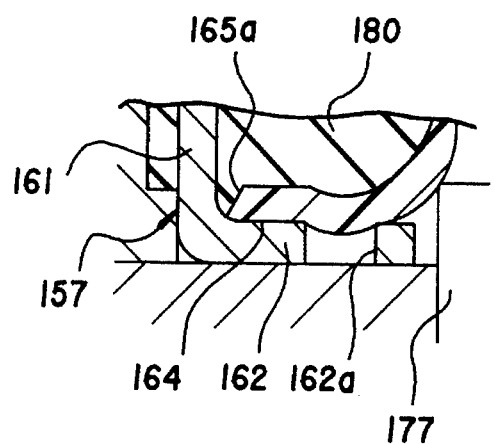
Figure 16B:
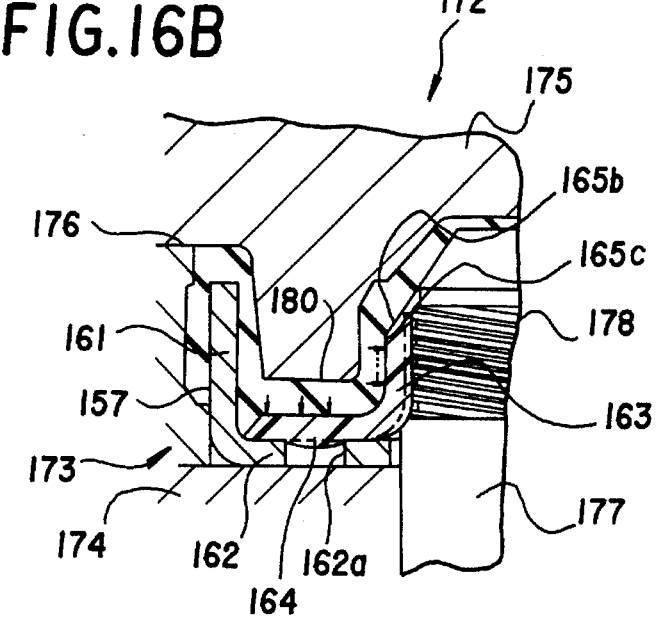

The mold 172 will now be described. The mold 172 is basically composed of an upper mold half 175 and a lower mold half 173 as shown in FIGS. 16A, 16B, and 16C. The lower mold half 173 has an annular recess 173a opened upwards, so that a sealed cavity is formed by closing the annular recess 173a by the upper mold half 175 when the two mold halves are closed.

The lower mold half 173 is composed of a first mold 174 which constitutes the bottom surface of the annular recess 173a, a second mold 176 serving as an intermediate mold which is placed on the first mold 174 and which constitutes the outer wall surface of the annular recess 173a, and a core 177 which is inserted into a hole 174a formed at the central portion of the first mold 174 and which constitutes the inner wall surface of the annular recess 173a. A transferring thread groove 178 having a profile obtainable by inverting the profile of the thread groove 163a to be formed in the resin seal lip 163 is formed in the outer surface of the core 177 which faces the annular recess 173a.

The molding process is performed as follows:

First, as shown in FIG. 16A, the reinforcing ring 157 and the intermediately-molded resin member 165 are inserted into the annular recess 173a of the lower mold half 173. The reinforcing ring 157 is inserted while causing its metal flanged portion 162 to face downwards, so that the metal flanged portion 162 is placed on the bottom surface of the annular recess 173a. Then, the outer extremity of the intermediately-molded resin member 165 is inserted into the annular recess 173a while being faced downwards. As a result, the outer extremity of the intermediately-molded resin member 165 comes in contact with the upper surface of the metal flanged portion 162 of the reinforcing ring 157 on the corner of the metal flanged portion 162 and the outer cylindrical portion 161. On the other hand, the inner extremity of the intermediately-molded resin member 165 is positioned on the top end of the core 177. It is preferable that the inner diameter of the intermediately-molded resin member 165 be substantially the same or smaller than the outer diameter of the core 177.

Then, as shown in FIG. 16B, the bottom-most portion of which is shown in an enlarged view in FIG. 16C, the raw rubber material 180 is heated and pressurized, and the cavity is filled with the fluidized raw rubber material 180, so that the second seal ring 155 having a predetermined shape is molded. The central portion of the intermediately-molded resin member 165, which has been plasticized due to heat applied at the time of clamping the molds, is bent into an L-shape due to the molding pressure of the raw rubber material 180, while its inner surface is pressed by the surface of the core 177, so that the resin seal lip 163 is molded. On the other hand, the outer surface of the same is pressed by the metal flanged portion 162, so that the resin flanged portion 164 is molded. Furthermore, the profile of the transferring thread groove 178 formed in the outer surface of the core is transferred to the inner surface of the resin seal lip 163.

Moreover, since the outer extremity surface 165a of the intermediately-molded resin member 165 is formed to provide a tapered surface, a V-shaped gap is caused between the reinforcing ring 157 and the outer cylindrical portion 161 as shown in FIG. 16C. The rubber-like material which invades this gap is forcibly pressed against the outer extremity surface 165a of the intermediately-molded resin member 165 by wedging action. Accordingly, it is extremely effective to utilize the outer extremity surface 165a as a surface to be bonded.

After the fluidized raw rubber material 180 has been hardened, the mold is opened so as to separate the molded product, so that the desired sealing device is manufactured by performing post-treatments such as a process of removing burrs undesirably formed on the leading portion of the rubber-like elastic seal lip 163.

Although omitted from illustration, a thread groove 163a formed in a surface of the rubber-like elastic seal lip 163 may be formed by a molding process performed in such a manner that a transferring thread groove is, in the surface of the core 177 of the mold 172, formed to have a profile obtainable by inverting the profile of the thread groove 163b. As an alternative to this, it may be formed by machining to be performed after the molding process has been completed.

It is to be understood that the present invention is not limited to the described embodiments and many other changes and modifications may be made without departing from the scope of the appended claims.

What is claimed is:

1. A method of molding a sealing device by using a mold having an inner cavity, comprising the steps of:

preparing a resin material having a cylindrical shape;

cutting the resin material to cut off a conical washer member;

chamfering an inner end portion of the cut conical washer member;

disposing the conical washer member in the cavity of the mold;

preparing an elastic material to be supplied in the cavity of the mold;

supplying the elastic material on the conical washer member in the mold;

pressuring the conical washer member and the supplied elastic material to fluidize the elastic material so that the cavity of the mold is filled up with the fluidized elastic material in a predetermined shape which includes a flanged portion; and deforming the conical washer member to have an L-shaped cross section by utilizing the pressure of the fluidized elastic material, so that an outer extreme end portion of the conical washer member provides a conical outer periphery having a predetermined inclination in the cavity with respect to said flanged portion.

2. A method according to claim 1, further comprising a step of applying a bonding agent on the outer periphery of the conical washer member before the elastic material is disposed thereon.

\* \* \* \* \*